United States Patent [19]
Ballu

[11] Patent Number: 4,512,516
[45] Date of Patent: Apr. 23, 1985

[54] AGRICULTURAL SPRAYER

[75] Inventor: Patrick J. Ballu, Reims, France

[73] Assignee: Tecnoma, Epernay, France

[21] Appl. No.: 392,325

[22] Filed: Jun. 25, 1982

[30] Foreign Application Priority Data

Jun. 25, 1981 [FR] France .................. 81 12495

[51] Int. Cl.³ .............................................. B05B 1/20
[52] U.S. Cl. .................................... 239/168; 239/587
[58] Field of Search ................ 239/163, 166-170, 239/172, 176, 587

[56] References Cited

U.S. PATENT DOCUMENTS

| 912,966 | 2/1909 | Lamiell et al. | 239/167 |
| 3,478,967 | 11/1969 | Horton et al. | 239/176 |
| 3,683,547 | 8/1972 | Harden | 239/288 |

FOREIGN PATENT DOCUMENTS

| 160111 | 12/1953 | Australia | 239/167 |
| 968065 | 11/1950 | France | 239/167 |
| 1091012 | 4/1955 | France | 239/167 |
| 2390892 | 12/1978 | France . | |
| 2409003 | 6/1979 | France . | |

Primary Examiner—Jeffrey V. Nase
Assistant Examiner—Michael J. Forman
Attorney, Agent, or Firm—Watson, Cole, Grindle & Watson

[57] ABSTRACT

An agricultural sprayer is disclosed which comprises a frame and generally rigid supports pivotably mounted on the frame in such a manner as to be able to oscillate freely under the action of their weight in order to assume vertical positions between the plants which are to be treated. Spray nozzles are disposed on the supports in such a manner that the product passing out of the nozzles is thrown onto the side faces of the plants. Catches which are mounted on the frame are operable to lock the supports in their vertical positions.

7 Claims, 6 Drawing Figures

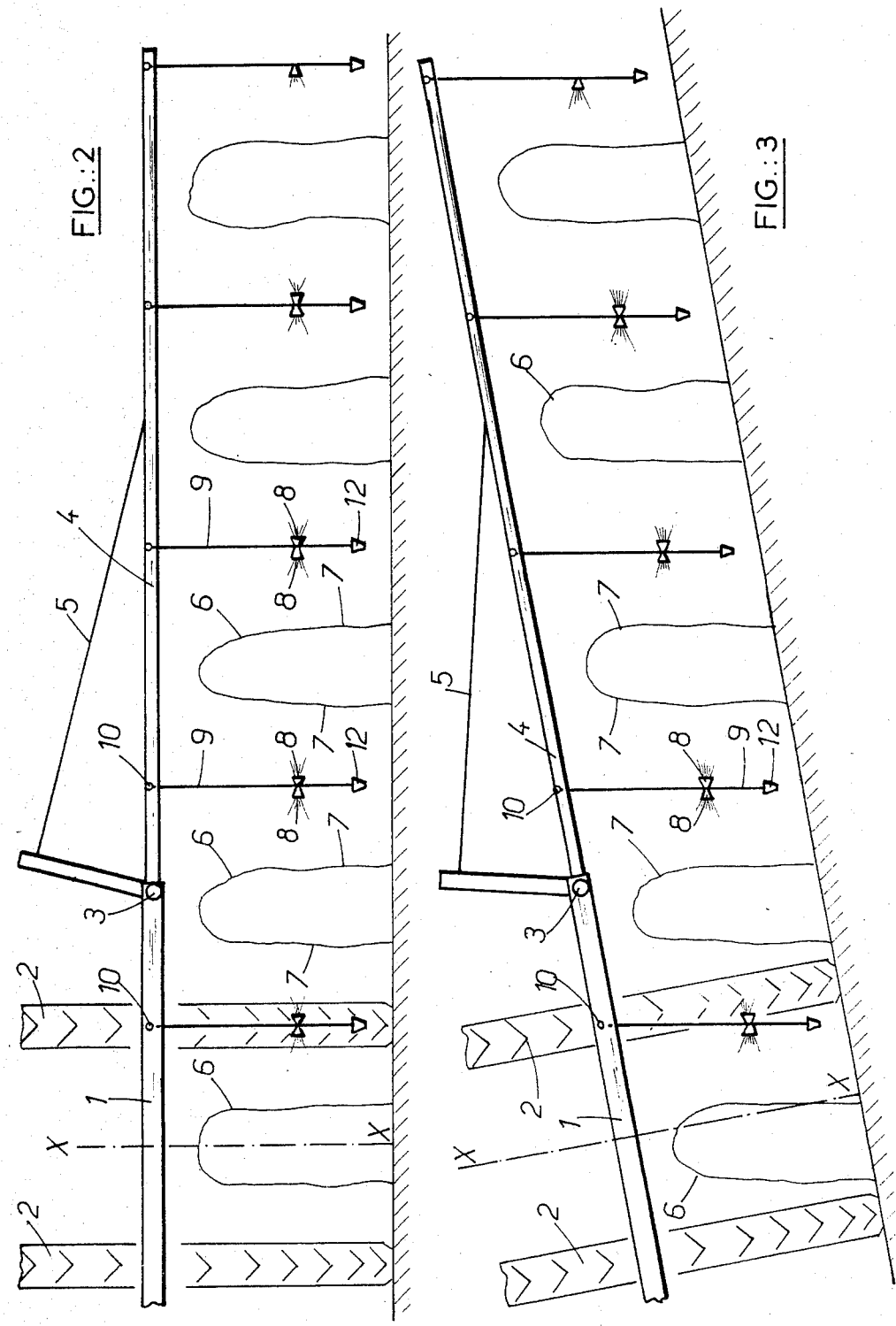

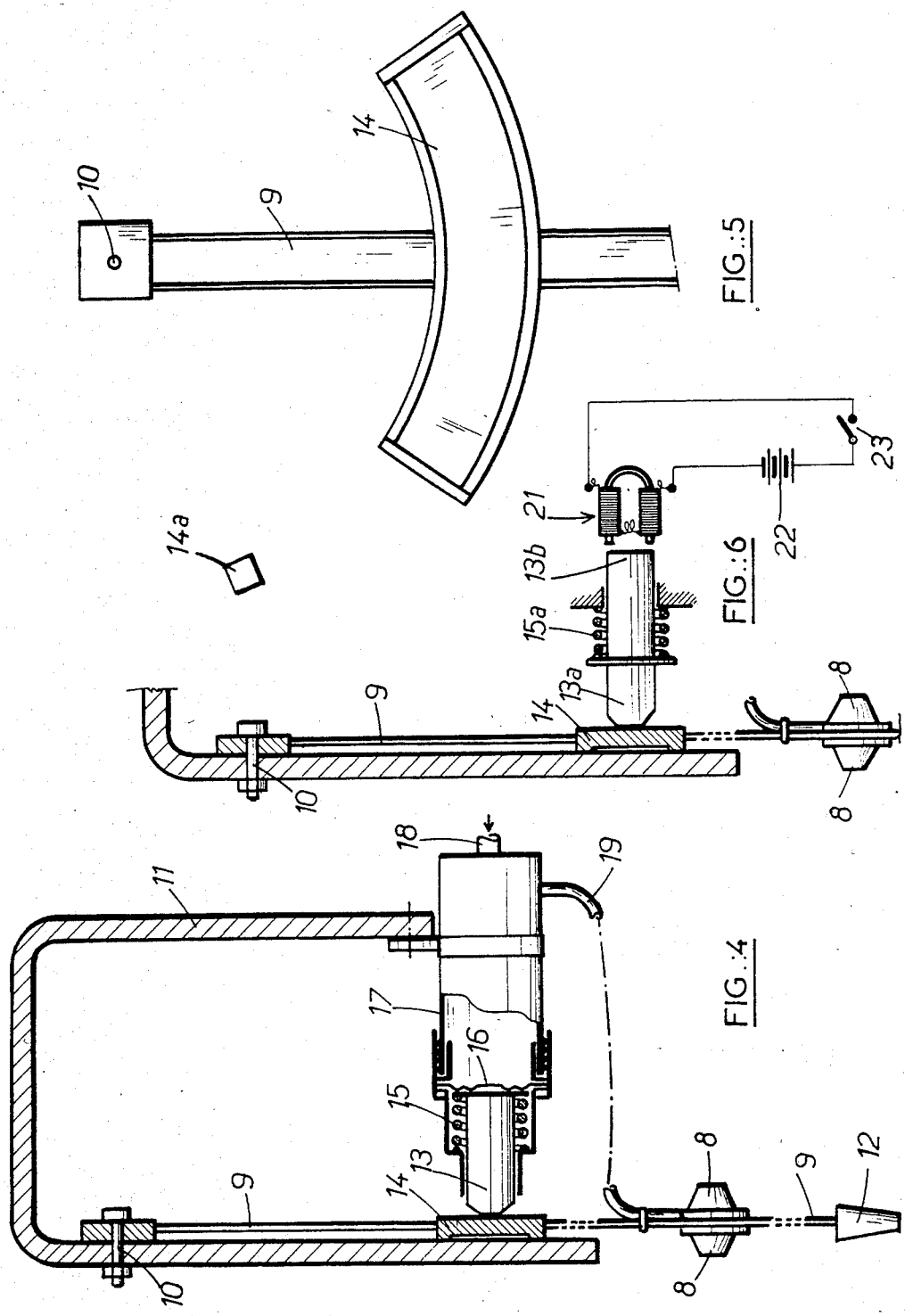

AGRICULTURAL SPRAYER

BACKGROUND OF THE INVENTION

The present invention relates to agricultural sprayers which are particularly suitable for treating plants arranged in rows straddled by the tractor coupled to the sprayer.

In apparatus of this kind it has already been proposed to mount spray nozzles on flexible tubes which hang in the gaps between the rows of plants in such a manner that the jets passing out of the nozzles reach the plants over their lateral development.

These devices, however, are not entirely satisfactory in operation because the jets passing out of the nozzles give rise to variable reactions, which cause the flexible tubes to oscillate.

The device forming the subject of the present invention is intended to overcome this shortcoming.

SUMMARY OF THE INVENTION

The main aim of the invention is to provide an agricultural sprayer comprising a frame, supports having a certain rigidity and pivoted on the frame in such a manner as to be able to oscillate freely under the action of their weight in order to assume vertical positions between the plants which are to be treated, spray nozzles disposed on the supports in such a manner that the product passing out of the nozzles is thrown onto the side faces of the plants, and catches adapted to lock the supports in their vertical positions.

The catches preferably operate automatically, being for example controlled by the pressure of the liquid sprayed.

The following description in conjunction with the accompanying drawings, which are given by way of non-limitative example, will make it clearly understood how the invention can be put into practice; features which emerge both from the drawings and from the text are of course a part of the invention.

Figure 1:
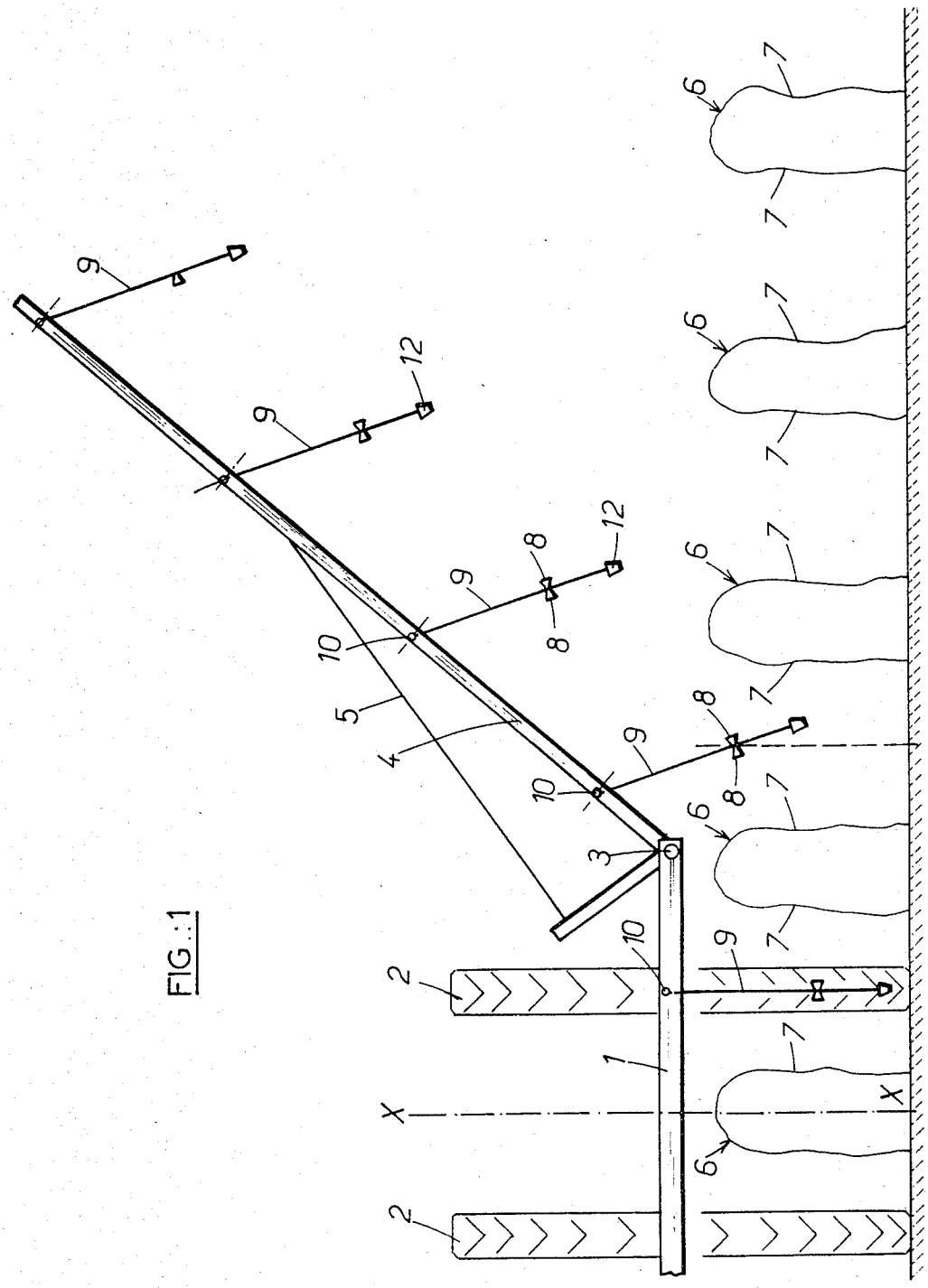
FIG. 1 is a diagrammatical view in vertical projection in a plane perpendicular to the direction of advance of the sprayer.

This Figure shows only one-half the apparatus, which is symmetrical in relation to the vertical plane represented by the line X—X. Also, the side arms of the sprayer frame are shown raised.

FIGS. 2 and 3 are similar views to FIG. 1, but show the side arms in the working position on horizontal and sloping ground, respectively.

FIG. 4 shows on a larger scale a cross-section of an arm of the frame, with a nozzle-carrier rod and its hydraulic catch.

FIG. 5 shows in projection, in a vertical plane perpendicular to that of FIG. 4, a rod with its locking pad.

FIG. 6 is a diagram of a modified arrangement.

DETAILED DESCRIPTION OF THE PREFERRED EMBODIMENTS

In FIGS. 1, 2 and 3 is shown diagrammatically (omitting accessory parts which do not form part of the invention) the fixed central portion 1 of the frame of the sprayer device, which is generally mounted at the back of a tractor or trailer carrying the tank of liquid to be sprayed. This frame usually comprises a lattice girder having a plane extending perpendicularly to the direction of movement of the tractor or trailer having wheels 2. At each end of this central frame is pivoted, on a pin 3, an arm 4 suspended by guys, such as 5, and adapted to assume either a working position as shown in FIGS. 2 and 3, or a raised position for travelling on roads or for clearing obstacles.

Since the plants to be treated are in parallel rows, as can be seen in FIGS. 1 to 3 where the rows 6—6 are shown in end projection, the tractor and its trailer are of the straddler type. The wheels follow the gaps between rows, and it is required to spray the liquid onto the side faces 7 of the plants in the rows.

The spray nozzles 8, which in this example are arranged in opposite pairs, are mounted on relatively rigid rods 9, which are pivoted at their top end 10 on the bottom flange of the arms 4 or of the central frame 1, which flange is in the form of an inverted U-section 11, as shown in FIG. 4.

Each rod, which is free to oscillate about its axis 10, therefore assumes a vertical position and may in addition be provided at its free bottom end with a weight 12 adapted to overcome friction and ensure vertical positioning.

If the apparatus is working on horizontal ground, the rods are therefore positioned perpendicularly to the arm 4, as can be seen in FIG. 2.

If on the contrary the work is being done on sloping ground, as shown in FIG. 3, the rods in the vertical position are inclined to a greater or lesser extent in relation to the arm 4 and to the central frame 1, depending on the slope of the ground.

In order to lock them in the vertical position and to prevent them from oscillating through the effect of the reactions of the liquid passing out of the nozzles, each of the rods is associated with a catch, one form of which can be seen in FIGS. 4 and 5. This catch comprises a push rod 13 cooperating with a pad 14 fixed on the rod 9 opposite the push rod and having (FIG. 5) the shape of a segment of a ring centered on the axis 10 and having an angle to the centre which corresponds to the possible deflection of the rod according to whether the ground is horizontal or sloping. This pad 14 is situated facing the inside wall of the flange 11, which also carries a stop 14a limiting the angular travel of the pad 14 and of the rod 9 when the arms 4 are raised (FIGS. 1 and 5).

The push rod 13 is associated with a return spring 15 urging it away from the pad 14. It also cooperates with a deformable diaphragm 16 closing a cylinder 17 into which the pressurized spraying liquid can be introduced by means of a nozzle 18. When the cylinder 17 is thus placed under pressure, the pressure acting on the diaphragm 16 pushes the push rod 13 against the pad 14, forcing the latter against the wall of the flange 11 and thus fixing the angular position of the rod.

The pressurized liquid is thus introduced into the cylinder 17 at the commencement of the movement of the tractor, when through free oscillation the rods have assumed their vertical position, which is thus fixed. It will be possible to modify the position of the rods if the slope of the ground changes, by cutting off the pressure in the cylinders 17 so that the push rods 13 will be moved away from the pads 14 by the return springs 15. A manual or electric valve makes it possible to apply pressure in the cylinders 17 or to cut off this pressure.

For each rod the spraying liquid intended for feeding the nozzles 8 can be conducted through a flexible hose 19 inserted into the corresponding cylinder 17, or it may be fed independently of this cylinder. In the latter case, the supply valve of the cylinder 17 may be separate from the supply valve of the nozzles 8. This arrangement has the advantage that it reliably ensures the locking of the rods in the vertical position before the spray nozzles are fed.

In another modified arrangement, the fluid operating the push rods 13 could be different from the spraying liquid, for example compressed air.

It is also possible to use the electric current supplied by the tractor battery, or any other source, by providing the rods with electromagnets. In this case, in order to avoid having to energize the electromagnets throughout the operating period of the sprayer, it is possible to arrange for each rod to be normally locked in position without the associated electromagnet being energized, while the temporary energization of the electromagnet at the commencement of the spraying operation will effect the temporary unlocking of the rod to enable it to assume the vertical position.

FIG. 6 shows an example of an embodiment of this kind.

The push rod 13a is normally held by a compression spring 15 against the pad 14 of the rod 9, which is thus locked. An electromagnet 21 can be momentarily energized by the battery 22 when the switch 23 is closed on commencing the spraying work. At that moment the armature 13b of the electromagnet, being fastened to the push rod 13a, is attracted and the push rod 13a is moved away from the pad 14 of the rod, freeing the latter, which can then assume the vertical position. When the switch 23 is then opened, the electromagnet 21 is deenergized and the push rod 13a, operated by the spring 15a, locks the rod in the vertical position.

It is obvious that the embodiments described are only examples, and that it would be possible to modify them, particularly by substituting technical equivalents, without thereby departing from the scope of the invention.

I claim:

1. An agricultural sprayer for discharging treating fluid onto the sides of plants, said sprayer comprising
 a frame adapted to lie parallel to the ground, said frame including a wall,
 a plurality of substantially rigid supports suspended from pivot points on said frame for free oscillation movement such that under the action of the weight thereof they can assume vertical positions between plants which are to be treated with treating fluid regardless of the slope of the ground, said substantially rigid supports including portions which lie below said pivot points and are juxtaposed to said wall of said frame, each of said portions comprising a pad which is arcuate in shape and which has a radius of curvature centered at the pivot point on said frame to which the respective substantially rigid support is attached,
 spray nozzles disposed on said supports for discharging treating fluid onto the sides of plants, and
 catch means mounted on said frame so as to interfere with said substantially rigid supports and lock said substantially rigid supports in said vertical positions, said catch means including a push rod associated with each of said substantially rigid supports for pushing the arcuate-shaped pads thereof into locked positions against said wall of said frame.

2. The sprayer according to claim 1, wherein said catch means further comprises a pressurized control member supporting each said push rod for moving each said push rod into said locked position, a return spring within each said member for urging each said push rod away from said support portions for unlocking said supports.

3. The sprayer according to claim 2, wherein each said control member is operated by a pressurized control fluid comprising said fluid to be sprayed.

4. The sprayer according to claim 3, wherein a fluid feed line interconnects each said spray nozzle and said control member.

5. The sprayer according to claim 3, wherein a fluid feed line is connected to each said spray nozzle and is separate from said control member.

6. The sprayer according to claim 1, wherein said catch means includes electromagnetic means for locking said supports.

7. The sprayer according to claim 6, wherein said electromagnetic means are provided for locking said supports when not energized and for freeing said supports when energized just before a spraying operation so that said supports have assumed said vertical positions when a spraying operation begins and are locked in said vertical positions during said spraying operation.

* * * * *